(12) United States Patent
Frattura et al.

(10) Patent No.: US 8,191,107 B1
(45) Date of Patent: May 29, 2012

(54) SYSTEM AND METHOD FOR LOST CONTACT RESPONSE

(75) Inventors: David E. Frattura, New York, NY (US); Richard W. Graham, Derry, NH (US)

(73) Assignee: Enterasys Networks, Inc., Andover, MA (US)

( * ) Notice: Subject to any disclaimer, the term of this patent is extended or adjusted under 35 U.S.C. 154(b) by 74 days.

(21) Appl. No.: 12/750,484

(22) Filed: Mar. 30, 2010

Related U.S. Application Data

(63) Continuation of application No. 11/076,590, filed on Mar. 9, 2005, now abandoned, and a continuation-in-part of application No. 12/408,289, filed on Mar. 20, 2009, now Pat. No. 7,739,372.

(51) Int. Cl.
*H04L 29/06* (2006.01)

(52) U.S. Cl. ............... 726/1; 726/22; 709/224; 719/318

(58) Field of Classification Search ................ 726/1, 22; 709/223–225, 243–244; 719/318
See application file for complete search history.

(56) References Cited

U.S. PATENT DOCUMENTS

| | | | | |
|---|---|---|---|---|
| 5,504,921 A | * | 4/1996 | Dev et al. .................... | 709/223 |
| 5,519,863 A | * | 5/1996 | Allen et al. ................... | 719/318 |
| 5,909,549 A | * | 6/1999 | Compliment et al. ......... | 709/223 |
| 6,321,261 B1 | * | 11/2001 | Glass ............................ | 709/223 |
| 6,601,082 B1 | * | 7/2003 | Durham et al. ............... | 718/100 |
| 6,711,171 B1 | * | 3/2004 | Dobbins et al. ............... | 370/400 |
| 6,990,592 B2 | * | 1/2006 | Richmond et al. ............ | 726/15 |
| 2003/0152067 A1 | * | 8/2003 | Richmond et al. ............ | 370/352 |
| 2004/0202197 A1 | * | 10/2004 | Gao et al. ..................... | 370/469 |
| 2005/0027837 A1 | * | 2/2005 | Roese et al. ................... | 709/223 |
| 2005/0108568 A1 | * | 5/2005 | Bussiere et al. ............... | 713/201 |
| 2006/0048142 A1 | * | 3/2006 | Roese et al. ................... | 717/176 |
| 2006/0136985 A1 | * | 6/2006 | Ashley et al. .................. | 726/1 |

* cited by examiner

*Primary Examiner* — Hadi Armouche
(74) *Attorney, Agent, or Firm* — Verrill Dana, LLP; Chris A. Caseiro

(57) ABSTRACT

A lost contact policy response system and related method for adjusting the operation of one or more network infrastructure devices upon detection of a loss of contact with a policy server function. The response system includes a policy enforcement function ("PEF"), a policy manager function, and either or both of policy set(s) and policy enforcement rule ("PER") set(s). The PEF implements stored or generated PER set(s). The policy manager function includes a monitoring function and an analysis function. The monitoring function monitors for continuing connectivity or signal exchange contact with a network policy server function. The analysis function selects a designated policy, policy set, PER or PER set, and instructs the PEF to implement the selected policy, PER or set. The policy and/or PER sets may be pre-installed, updated, re-installed, revised, or otherwise changed when and as desired. The related method includes corresponding steps for implementing the operations of the functions described.

24 Claims, 3 Drawing Sheets

SYSTEM AND METHOD FOR LOST CONTACT RESPONSE

CROSS REFERENCE TO RELATED APPLICATIONS

This application is a continuation, and claims the priority benefit, of U.S. nonprovisional patent application Ser. No. 11/076,590, filed Mar. 9, 2005, entitled "System and Method for Lost Contact Response," which claims the priority benefit of U.S. provisional patent application Ser. No. 60/552,001, filed Mar. 10, 2004, entitled "Lost Contact—Local Dynamic Policy Response" assigned to a common assignee. The contents of those two applications are incorporated herein by reference. This application is also a continuation-in-part, and claims the priority benefit, of U.S. nonprovisional patent application Ser. No. 12/408,289, filed Mar. 20, 2009, entitled "System and Method for Dynamic Policy Management," which is a continuation of U.S. nonprovisional patent application Ser. No. 10/629,331, filed Jul. 29, 2003, entitled "System and Method for Dynamic Policy Management," now U.S. Pat. No. 7,526,541 issued Apr. 28, 2009, both of which have been assigned to a common assignee. The contents of those two applications are also incorporated herein by reference.

BACKGROUND OF THE INVENTION

1. Field of the Invention

The present invention relates to systems and methods for responding to conditions of network operation when connection to a policy server is lost. More particularly, the present invention relates to systems and methods for configuring one or more network devices to activate policy enforcement rules locally when such contact is lost.

2. Description of the Prior Art

Interconnected computing systems having some sort of commonality form the basis of a network. A network permits communication or signal exchange among computing systems of a common group in some selectable way. The interconnection of those computing systems, as well as the devices that regulate and facilitate the exchange among the systems, represent a network. Further, networks may be interconnected together to establish internetworks. For purposes of the description of the present invention, the devices and functions that establish the interconnection represent the network infrastructure. The users, computing devices and the like that use that network infrastructure to communicate are referred to herein as attached functions and will be further defined. The combination of the attached functions and the network infrastructure will be referred to as a network system.

Presently, access to applications, files, databases, programs, and other capabilities associated with the entirety of a discrete network is restricted primarily based on the identity of the user and/or the network attached function. For the purpose of the description of the present invention, a "user" is a human being who interfaces via a computing device with the services associated with a network. For further purposes of clarity, a "network attached function" or an "attached function" may be a user connected to the network through a computing device and a network interface device, an attached device connected to the network, a function using the services of or providing services to the network, or an application associated with an attached device. Upon authentication or other form of confirmation of the offered attached function identity, the attached function may access network services at the level permitted for that identification. For purposes of the present description, "network services" include, but are not limited to, access, Quality of Service (QoS), bandwidth, priority, computer programs, applications, databases, files, and network and server control systems that attached functions may use or manipulate for the purpose of conducting the business of the enterprise employing the network as an enterprise asset.

A network administrator grants particular permissions to particular attached functions by establishing policies which are enforced at various points in the network. A policy is an action (or nonaction) to be undertaken based on the existence or occurrence of a defined condition or event referred to herein as a trigger. Policies are generally directed to administration, management, and/or control of access to or usage of network services. A policy may also be a policy abstraction that is the translation of one or more policies to a different level of abstraction. For example, multiple policies may be bundled into a higher-level abstract policy for ease of handling and naming; a policy set is simply a policy composed of one or more policies. A policy enforcement rule (PER) is a set of instructions or steps to be performed to implement the specified action defined by a policy. Particular PERs are dependent upon the particular network infrastructure device and its programming. Some PERs are described in Internet Engineering Task Force (IETF) Request For Comments (RFC) 3198 and 3060.

A network session is the establishment of an association between an attached function and one or more network services through the network infrastructure. It is to be understood, however, that a network system may be embodied in the combination or interrelation between one or more attached functions and one or more network infrastructure devices. In general in the prior art, policies and PERs are established prior to the creation of a network session but not specifically implemented in advance on a network device. At the outset of a network session, often in relation to the authentication of the entity requesting the session, an association is created between the session and one or more network services, constrained by one or more policies enforced based on PERs carried out by one or more devices of the network infrastructure. Any later adjustment tends to occur manually in an effort to respond to an intrusion event or activity of some type.

Under RFC 3198, a network entity that "enforces" policies is called a Policy Enforcement Point (PEP). The PEP evaluates rule conditions and subsequently applies rule actions. For example, an email policy may contain rules to constrain the bandwidth (the amount of traffic forwarded within a given timeframe); the PEP enforces the rule by recognizing email traffic (i.e., evaluating the rule condition) and limiting the amount of traffic forwarded within the specified timeframe (i.e., executing the rule action).

Further under RFC 3198, policies are distributed to network entities by a Policy Decision Point (PDP), which utilizes administrator-defined rules to "decide" which policies should be distributed to which entities. The decision may be made to pre-configure policies in a PEP prior to processing events; this is called "provisioned policy." The decision may be made dynamically in response to some network event, where the PEP detects the event and sends a "policy request" to the PDP to determine which policy should be applied; this is referred to as "outsourced policy." Policies may be distributed to a PEP before the start of any network session, when a network session is started, or during a network session in response to various conditions, such as a change in business policy that leads to changes in network policies. Policies may be altered dynamically, prior to distribution, based on certain parameters, such as the IP address of an attached function or the authenticated identity of a user. It is to be understood that while reference is made herein to specific aspects of IETF RFC descriptions and definitions, the present invention encompasses such policy provisioning means as well as other means for regulating and protecting network functions. The terms PDP and PEP may be employed herein, however, generic reference to policy provisioning and enforcement may be made and deemed to include PDP and PEP functions. The PDP is generally embodied in a policy server device of the network system.

Events and activities do occur that may be harmful to the network system. For purposes of this description, harm to the network system includes, for example, denying access to the network, denying access to the service once permitted access to the network, intentionally tying up network computing resources, intentionally forcing bandwidth availability reduction, and restricting, denying or modifying network-related information. Intrusion Detection Systems (IDS) are used to monitor the traffic associated with network sessions in an effort to detect harmful activity. However, IDS functions normally only monitor traffic, they do not analyze the information gathered nor do they generate or enforce PERs. IDS systems with multiple embedded functions may provide more PERs services. They are designed to observe the packets, the state of the packets, and patterns of usage of the packets entering or within the network infrastructure for harmful behavior. However, until recently with the availability of the Distributed Intrusion Response System by Enterasys Networks of Andover, Mass., common owner of the invention described herein, the available IDSs do not prevent packet entry to the network infrastructure. Further, for the most part, they only alert a network administrator to the existence of potentially harmful behavior but do not provide an automated response to the detected occurrence. There is some limited capability to respond automatically to a detected intrusion. However, that capability is static in nature in that the response capability is ordinarily restricted to limited devices of the network infrastructure and the response is pre-defined and generated by the network administrator for implementation on specified network infrastructure devices. The IDS is of no help when the harm has occurred, other than to provide information for subsequent forensic investigation. That is, it cannot prevent the harm.

For the most part, existing IDSs report possible intrusions to a centralized application for further analysis. That is, all detected potentially harmful occurrences are transferred to a central processing function for analysis and, if applicable, alarm reporting. Upon receipt of an alarm, the network administrator can either do nothing, or implement a response function through adjustment of the operation of one or more network infrastructure devices. That adjustment is made based upon the analysis output and then forwarding by the PDP of instructions to carry out designated PERs, or forwarding of the PERs directly. Unfortunately, if contact between the PDP and the network infrastructure device tasked as the PEF device is lost, the policy changes desired may not be implemented and the network harm would remain. Therefore, what is needed is a function designed to enable one or more network infrastructure devices to provide policy enforcement functionality locally. That is, what is needed is a function that enables a local network infrastructure device to make necessary policy enforcement changes based upon the loss of contact with a PDP such as a policy server. The policy enforcement changes are preferably activated upon the change of contact condition.

SUMMARY OF THE INVENTION

The present invention is a lost contact policy response system and related method for adjusting the operation of one or more network infrastructure devices upon detection of a loss of contact with a policy server function. The invention is a response function enabled in one or more selected network system devices. The response system includes a policy enforcement function ("PEF"), a local policy manager function, and either or both of policy set(s) and policy enforcement rule ("PER") set(s) stored on one or more network system devices. The PEF implements stored or generated PER set(s). Among other functions to be described herein, the local policy manager function provisions policy and/or PER sets, and initiates the implementation of policy enforcement changes. For the purpose of this description, a policy "set" may constitute one or more policies and a PER "set" may constitute one or more PERs. Policy sets and PER sets may be identified by unique identifiers. The local policy manager function includes a monitoring function and an analysis function. The monitoring function is directed to sporadic or periodic checking for continuing connectivity or contact with one or more network system devices deemed to be all or a portion of the central network policy server function. Information associated with the monitored connection is forwarded to the analysis function. Upon identification of a condition deemed to require a response, the analysis function selects a designated policy, policy set, PER or PER set, and instructs the PEF to implement the selected policy, PER or set.

The network system devices may have unique combinations of policy and/or PER sets, all devices may have the same policy and/or PER sets, or there may be one or more groups of devices having particular policy and/or PER sets stored thereon. The policy and/or PER sets may be pre-installed, updated, re-installed, revised, or otherwise changed when and as desired. One or more network system devices include a PEF, and any one or more network system devices may have a plurality of PEFs. Similarly, the policy manager function may be pre-installed, updated, re-installed, revised, or otherwise changed when and as desired. PER sets include, but are not limited to, rate limiting of all traffic otherwise forwarded by the device except control traffic, bandwidth limiting "leaf ports" to ensure a core switching connection will not be overloaded, and disabling certain protocols. Additionally, responses to identified triggering conditions may be evoked, loaded, calculated, or enabled on an escalating or declining scale, dependent upon the particular enforcement function, length of time contact is lost, time of day, incomplete connectivity, or other preloaded conditions or PER sets.

The PEF may be enabled in one or more network system devices, including, for example, a Wide Area Network (WAN) router, a central switch device, a network entry device, a network management device, or any combination of network system devices. A PEP referred to in RFC 3198 would include such policy enforcement functionality. The PEF implements the PERs associated with a policy. The PEF may implement PERs already stored on the device; it may map PERs from policy set(s) already stored, or a combination of the two. For example, in one network system device, a rapid response command may be received to implement a designated policy set, while in another device, a command may be received to implement a designated PER set. The former device would include some mapping function to map the instructed policy set into PERs that the device is capable of carrying out. On the other hand, the latter device would be positioned to implement the designated PERs without the mapping step and therefore would likely implement them in a quicker fashion. As with the other functions of the system of the present invention, the PEF may be established in hardware, firmware, software, or any combination thereof.

As indicated, the policy manager function receives information regarding server connectivity and compares that information with known triggers information. The policy manager function includes one or more updateable databases of trigger information and policy and/or PER sets deemed responsive to such triggers. The policy manager function may further monitor and gather relevant event data, store events, histories, logs, products, product mappings, data dictionaries and other information deemed by the administrator to be of value. The policy manager function may coordinate communications among enforcement devices, such as by broadcast, multicast, and unicast messages. It may further manage the state of the PERs for one or more PEFs. The policy manager function may also confirm the status of implementation of an initiated policy/rule set change. As with the other functions of the system of the present invention, the policy manager function and any related functions may be established in hardware, firmware, software, or any combination thereof.

As noted, the policy manager function of the invention initiates execution of designated policy and/or PER sets that have either been pre-installed or provisioned to one or more PEFs. The policy manager function initiates implementation of one or more policy and/or PER sets by instructing one or more PEFs, directly or through one or more other policy manager functions, to implement the designated policy and/or PER sets. The policy manager function may communicate to the applicable PEF(s) through one or more shorthand identifiers the policy and/or PER set(s) to be implemented for the purpose of response to trigger information.

In one aspect of the invention, a method is provided for changing one or more policies and/or one or more policy enforcement rules of one or more of a plurality of network infrastructure devices of a network system when contact with a central policy server has been lost. The method includes the steps of installing on one or more of the plurality of network devices one or more policy sets, one or more policy enforcement rule (PER) sets, or a combination of policy and PER sets, associated with usage of the network system, monitoring communications between the one or more of the plurality of network infrastructure devices and the central policy server function for one or more lost contact triggers, upon detection of one or more lost contact triggers, selecting one or more policy sets and/or PER sets deemed responsive to the detected lost contact trigger or triggers, and instructing one or more of the one or more network devices to implement the selected one or more policy sets and/or PER sets.

In another aspect of the invention, a system is provided for responding to lost contact between one or more network infrastructure devices of a network system and a central policy server function. The system includes one or more of the plurality of network devices having installed thereon one or more policy sets, one or more policy enforcement rule (PER) sets, or a combination of policy sets and PER sets, an analysis function for analyzing monitored central policy server function connection information and relating policy changes with the monitored information, an implementation function for signaling one or more policy set or PER set changes corresponding to each of the one or more policy sets and PER sets upon detection of a change of the central policy server function connection information, and a policy enforcement function (PEF) for implementing on one or more of the one or more of the plurality of network devices a select one or more of the one or more installed policy sets and/or PER sets received from the implementation function.

In another aspect of the invention, there is an article of manufacture comprising a machine-readable medium that stores executable instruction signals that cause a machine to perform the method described above and related methods described herein.

The details of one or more examples related to the invention are set forth in the accompanying drawings and the description below. Other features, objects, and advantages of the invention will be apparent from the description and drawings, and from any appended claims.

DETAILED DESCRIPTION OF PREFERRED EMBODIMENTS OF THE INVENTION

Figure 1:
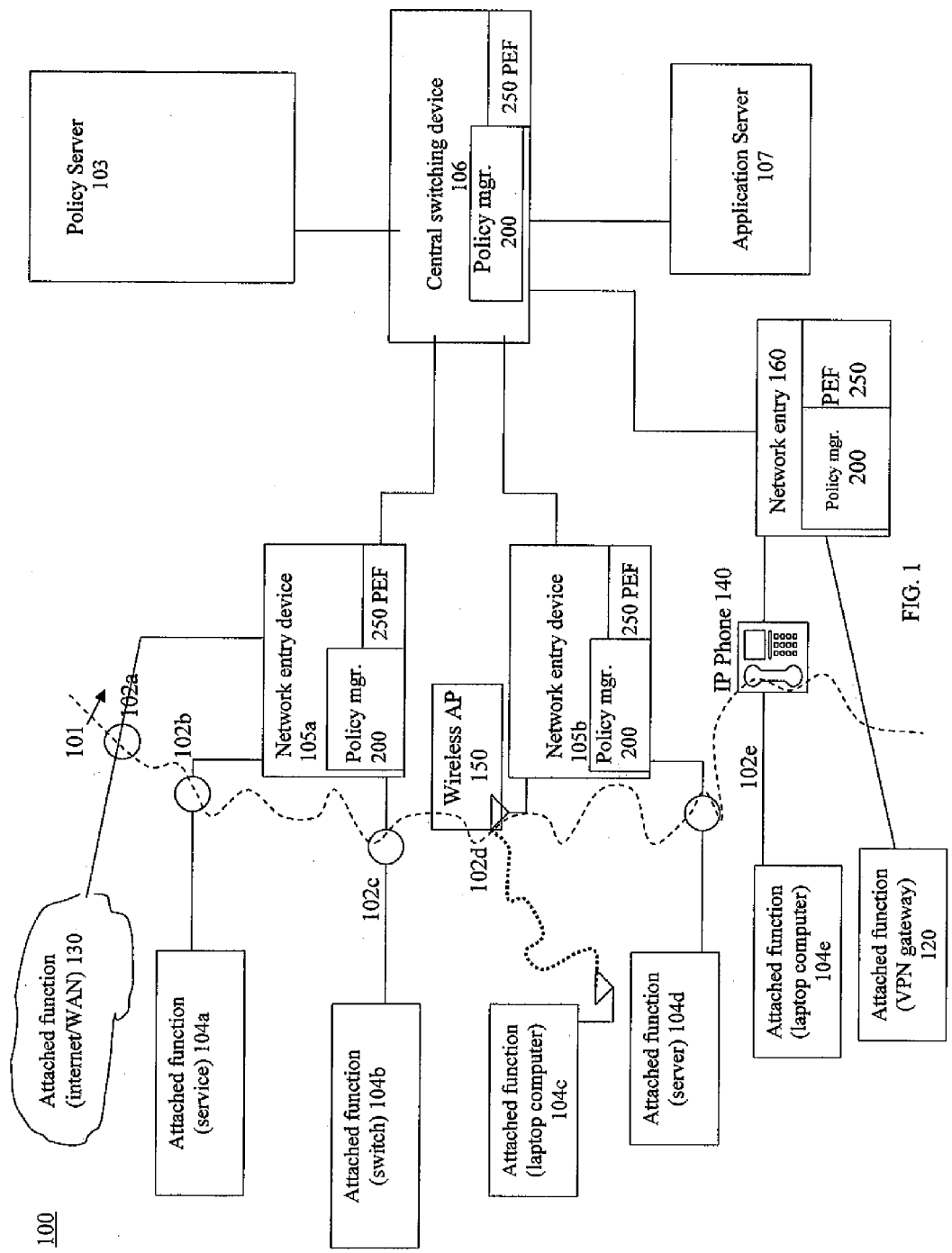
FIG. 1 is a simplified diagrammatic block representation of an example network system with the lost contact response system of the present invention.

The present invention is a system and related method to protect the operation of a network system when contact with a central policy server function is lost or deviates from an expected condition. Referring to FIG. 1, a network system 100 incorporating the capability of the lost contact response system of the present invention operates and provides network services to attached functions according to policies and PERs to devices of a network infrastructure 101 through which the attached functions access and use services of the network system 100. Network system 100 includes the network infrastructure 101 and one or more attached functions connected to or connectable to the network infrastructure 101. The network infrastructure 101 includes multiple switching devices, routing devices, firewalls, IDSs, access points, Metropolitan Area Networks (MANs), WANs, Virtual Private Networks (VPNs), and internet connectivity interconnected to one another and connectable to the attached functions by way of connection points (e.g., 102a-e). The network infrastructure 101 includes such devices having forwarding functionality for the purpose of accessing and using network services.

A lost contact response system of the present invention includes a PEF 250 and a local policy manager function 200. The policy manager function 200 preferably includes, at a minimum, a monitoring or "watchdog" function, an analysis function, and an implementation function. The analysis function analyzes monitored information to determine whether that information includes one or more conditions, events, occurrences, etc. ("triggers") for the purpose of implementing one or more policy enforcement changes. For the purpose of the present invention, a trigger is anything indicating a deviation from an expected norm of the connection between a network infrastructure device or set of devices and a central policy server function. The analysis function further determines whether the one or more triggers require the implementation of one or more responses through the PEF 250. The implementation function of the policy manager function 200 signals to one or more PEFs particular enforcement policy and/or PER sets to be implemented thereon in response to the trigger(s). The policy manager function 200 associates responsive policies to be implemented and signals the selected PEF(s) to implement the selected policy sets and/or PER sets. Policies, through the PERs, may be implemented differently on different PEFs and may be implemented and removed at different times and gradually or completely. For example, the signaling of the implementation of a particular lost contact response policy may cause one type of operation by one PEF and another type of operation by another PEF. For purposes of this description, a device with at least one PEF may include a network device as traditionally understood. It may also be a port or set of ports or an interface, such as a virtual interface, or a set of such interfaces.

Continuing with reference to FIG. 1, an attached function is external to infrastructure 101 and forms part of network system 100. Examples of attached functions 104a-104e are represented in FIG. 1, and may be any of the types of attached functions previously identified. Network infrastructure entry devices 105a-b, 140, and 160 of infrastructure 101 provide the means by which the attached functions connect or attach to the infrastructure 101. Alternative entry means may be used as noted in the following paragraph. A network entry device can include and/or be associated with a wireless access point 150. For wireless connection of an attached function to the infrastructure 101, the wireless access point 150 can be an individual device external or internal to the network entry device 105b. For the purpose of illustrating the response system of the present invention, each of the network entry devices except phone 140 includes the PEF 250 and the local policy manager function 200. It is to be noted that a phone may include a PEF; however, that is not shown in FIG. 1. The network system 100 may include other network devices without the PEF 250. One or more centralized network infrastructure devices may include the PEF 250 and the local policy manager function 200. Further, there may be a combination of network entry and centralized forwarding devices having the PEF 250 and policy manager function 200 of the present invention. It is also to be noted that a PEF 250 and/or a policy manager function 200 may be included as part of one or more attached functions.

One or more central forwarding devices, represented by central switching device 106, enable the interconnection of a plurality of network entry devices, such as devices 105a-b and 160, as well as access to network services, such as central policy server function 103 or an application server 107. It is to be understood that a central forwarding device, or an entry forwarding device, is not limited only to switches as that term is traditionally understood. Instead, the forwarding device may be any device capable of forwarding signals through the network infrastructure pursuant to forwarding protocols. The central switching device 106 enables the interconnection of the network infrastructure 101 to attached functions that include VPNs (represented by VPN gateway device 120) and WANs (represented by internet cloud 130) as well as Internet Protocol (IP) telephones (represented by telephone 140). It is to be understood that the IP telephone 140 may also perform as a network entry device for the purpose of connecting an attached function, such as a laptop computer, to the network infrastructure 101.

One or more devices of the network infrastructure include the PEF 250 of the lost contact response system of the present invention. The PEF 250 includes one or more policy and/or PER sets each of which may be associated with a unique identifier, pre-installed on the one or more network system devices including, for example, entry devices 105a, 105b, and 160, as well as central switching device 106. The PEF 250 may be established in hardware and/or software (e.g., a function embodied in an application executing on one or more devices of the network infrastructure 101) to implement responses. The particular network device on which the PEF 250 resides may vary from manufacturer to manufacturer. As previously indicated, a device may also be a port or set of ports, an interface or a set of interfaces.

Figure 2:
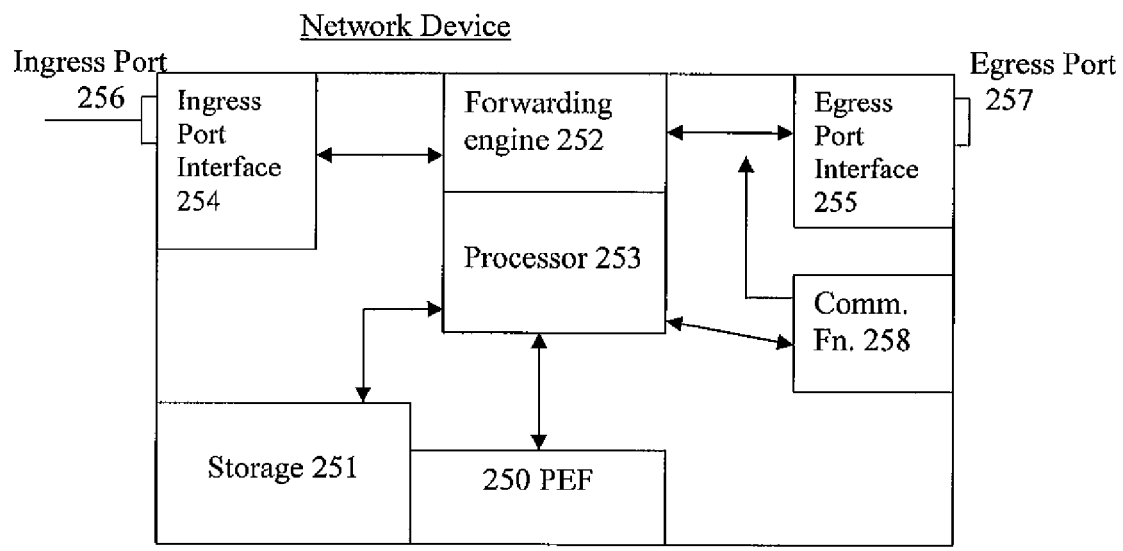
FIG. 2 is a simplified block representation of a network infrastructure device including the policy enforcement function of the present invention.
Figure 3:
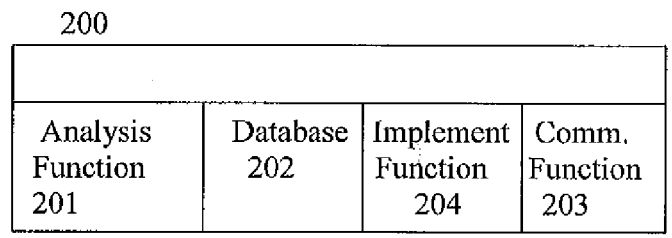
FIG. 3 is a simplified block representation of a policy manager function of the present invention.

As illustrated in FIGS. 2 and 3, the lost contact response system of the present invention includes several functions and elements. It is to be noted that all functions and elements may be embodied in one or more devices of the network 100. However, the PEF 250 of FIG. 2 will preferably be embodied in one or more forwarding devices of the network infrastructure 101, and the policy manager function 200 of FIG. 3 may also be embodied in one or more forwarding devices of the network infrastructure 101. However, it is to be noted that the policy server 103 may include a policy manager function 200, at least with respect to initial distribution of policy and/or PER sets for the forwarding devices. Further, there may be a plurality of policy manager devices, each configured to distribute one or more different policy and/or PER sets. For example, there may be a policy manager function configured for packet forwarding, one for database access, another for application access, yet another for authentication and/or authorization, another for accounting, another for reporting, another to define when a human operator or administrator is or is not to be contacted regarding a detected event, and so on. Such different types of policy manager functions may be embodied in one or more devices.

A network device including the PEF 250 preferably also includes storage means 251, such as a database or a caching function, having one or more installed policy and/or PER sets, and optionally, corresponding related identifier(s), any of which may be updated or changed as desired. Whether a particular network device with PEF 250 specifically includes particular policy and/or PER sets stored directly thereon is dependent upon the particular hardware and programming of the device. A "simple" device may only have a store of PER sets to be implemented. That is, upon detection of a triggering condition, i.e., the loss of contact with the centralized policy server 103, for example, will result in the implementation of one or more PER sets previously stored on the device for that purpose. On the other hand, a "sophisticated" device may only have stored policy set(s) to be implemented. It is up to the sophisticated device to map a policy set into PER set(s) suitable for the sophisticated device to implement, perhaps slightly differently based on port type, speed or usage, in response to a detected triggering condition. A mapping function is required as part of the sophisticated device for that purpose and may provide more specific tailoring of the policies to the exact device and/or port or interface. The storage means 251 may be updated periodically or as a result of an event occurring anywhere in the network infrastructure 101. The storage means 251 may be a single database comprised of one or more updateable tables of information. A network infrastructure device having forwarding functionality and with the PEF 250 includes a forwarding engine 252, a processor 253, an ingress port interface 254, an egress port interface 255, and a communication function 258.

As shown in FIG. 3, the policy manager function 200 includes an analysis function 201, an implementation function 204, and a database 202. The policy manager function 200 further includes a communication function 203 including means for receiving network information, such as from an IDS designed to detect intrusion information occurring at one or more network infrastructure connection points. Further, the policy manager function 200 may receive through the communication function 203 trigger information from other means, such as a human operator or administrator to initiate the analysis and/or PEF 250 operation. The communication function 203 may also include means for the policy manager function 200 to exchange messages with one or more other network system devices, including other devices with the PEF 250. The communication function 203 may be one or more connections to one or more network system devices having the capability to implement policy change instructions, to detect intrusions and report detected intrusions to other devices of the network infrastructure 101, or a combination of both. The storage means 251 of the PEF 250 and the database 202 of the manager function 200 may be a common database or a plurality of distinct databases.

The database 202 of the manager function 200 includes trigger information. The trigger information may be any type deemed by the network administrator suitable for generating a policy change through the PEF 250. For the purpose of the description of the present invention, trigger information includes loss of contact with a centralized policy management server function, such as policy server 103, or loss of contact with one or more other specified devices of the network infrastructure 101, or one or more other elements of the network system 100. Loss of contact may include, but not be limited to, timed out delay in responding to a "hello" message. The trigger information may be initially generated by the policy server 103, or some other sort of centralized network infrastructure device and installed in the forwarding device, installed in flash memory of the forwarding device, or distributed from a peer, and stored in the database 202. The trigger information is stored or cached in the database 202 in advance and is not solely supplied in reaction to a triggering condition or event that may be occurring on that particular network system device. Examples of policies stored in database 251 are provided in co-pending U.S. patent application Ser. No. 10/629,331 entitled "System and Method for Dynamic Network Policy Management" of John Roese et al. and assigned to a common assignee. The content of that co-pending application is incorporated herein by reference. The database 202 may further include, for example, means for finding PEFs 250, identifiers to policy and/or PER set mappings, historical information, event logs, policy set to policy implementation element mapping, policy element to policy enforcement function element mapping, and the like. The information of storage means 251 may also be stored in database 202 of policy manager function 200.

With continuing reference to FIGS. 2 and 3, the analysis function 201 performs the function of evaluating the condition of the particular forwarding device including the PEF 250, and may also evaluate the condition of the network system 100, determining whether the information includes one or more lost contact triggers requiring initiation of one or more changes of one or more policy and/or PER sets, and matching detected triggers with appropriately responsive policies. The analysis function 201 may provide choices on options for responding to particular lost contact triggers, the gathering of additional information from the same and/or additional sources, reporting to other policy manager functions, creating new and/or modified policy and PER sets, and enabling policy changes including, for example: 1) rate limiting of all signal exchange traffic on the forwarding device except control traffic; 2) bandwidth limiting leaf ports to insure that centralized devices of the network infrastructure 101 do not become overloaded; 3) disabling one or more signal exchange protocols; 4) searching for and establishing contact with an alternative centralized or localized policy server; and 5) other selectable policy changes, including those listed in the referenced co-pending application. Upon recognition of trigger information stored in the database 202, the analysis function 201 selects the policy set, PER set, or combination of policy and PER set(s) deemed responsive to the detected trigger(s). The analysis function 201 passes the policy set, PER set, or combination of policy and PER set(s) to the implementation function 204, which in turn instructs the PEF 250 to implement the policy and/or PER set by signaling the processor 253 to initiate the enforcement of the selected policy and/or PER set(s). The interaction of the identified functions that may be embodied in a single forwarding device as hardware, software, or a combination of the two, enables that forwarding device to respond to a loss of contact with one or more network infrastructure devices with tailorable policy implementations configured to protect the network without necessarily shutting down the entire network, including in the case of loss of contact with, or a malfunction of, the policy server 103. As previously noted, the policy manager function 200 may include a mapping function to translate policies into PERs.

The policy and/or PER set implemented in response to the detected lost contact trigger may be changed based on further evaluation of the network. For example, a first trigger may cause the policy manager 200 to initiate the enforcement of a policy designed to rate limit all but control signal traffic upon detection of a loss of contact with the policy server 103. Upon further evaluation of the characteristics of the network system 100 or after a specified period of time, for example, it may be determined that that particularly restrictive policy in place is to be replaced with a less restrictive policy, including, optionally, a complete or partial return to the operating policy(ies) until or at such time as the contact is regained. It is to be noted that the forwarding device including the PEF 250 and the policy manager 200 will preferably ordinarily operate in an integrated manner under the policy control of the central policy server 103 or its equivalent unless and until a lost contact trigger is detected. The policy server 103 may modify policies and/or PER sets during normal operations, including those stored or cached on the forwarding device to be implemented in response to a detected lost contract trigger Referring back to FIGS. 1 and 2, an attached function such as a service 104a attaches to infrastructure 101 through connection point 102b (e.g., a jack in a wall). Network infrastructure entry devices 105a-b and central switching device 106 connect to each other using cables and connection points in a similar manner. A connection port is the physical port through which a network client communicates. Referring to FIG. 2, the network entry device includes ingress port 256 and an egress port 257. The network entry device is configured at ingress port interface 254 to recognize and exchange signals with the attached function. The signals pass from the ingress port interface 254 to the forwarding engine 252 for forwarding decisions. Forwarding decisions include, but are not limited to, forwarding through egress port interface 255 received signals to other network infrastructure devices, such as an authentication server, the application server 107, and the central switching device 106. The forwarding engine 252 may be any type of forwarding function including, but not limited to, a Layer 2 switch or bridge or a Layer 3 router. The processor 253 communicates with the forwarding engine 252, the database 251, and, via the egress port interface 255, the policy manager function 200. One or more of the described interfaces, functions, forwarding engine, and processor may be discrete components, or parts of one or more common components. They may be coupled together as module components in any combination of hardware, firmware, software, microcode or any combination thereof.

Access by an attached function to the network services associated with network system 100 includes a setting of static and/or dynamic policies, referred to generally as a set of policies, for the attached function. Sets of policies are initially established by the network administrator or by pre-installed ingress and egress policies. Information regarding an attached function seeking or having access to network services and the policies may be stored centrally or in a distributed manner, including being stored locally. In an example of a centralized approach, attached function and policy information for all of the connection points of the network system 100 is stored in a server such as policy server 103. In an example of a distributed approach, attached function and policy information for all attached functions, or a portion of the attached functions, may be stored in one or more of the local network devices 105*a-b* and 106 of the network infrastructure 101. The policy server 103 representing a single policy server including all types of policies to be enforced, or representing a distributed policy server set, may include trigger information and provisioning information for one or more network infrastructure devices. It is also to be noted that the policy server 103 as described may be further divided into one or more servers for distributing policy sets to the enforcement functions and one or more servers for distributing just the rapid response identifiers of those policy sets when initiation of enforcement of a policy is desired.

Entry to the network system 100, and the infrastructure 101 primarily, may be initially regulated using authentication systems such as Network Operating Systems (NOSs), Remote Authentication Dial-In User Service (RADIUS), described in IETF RFC 2138, and IEEE 802.1X standard, which provides for port-based network entry control based on a MAC identifier. In the case of NOS and RADIUS, an authentication server provides the mechanism for establishing such authentication. RADIUS may also provide authorization and, optionally, accounting capability related to network usage. In the case of IEEE 802.1X, the network entry devices may be configured with such authentication capability, as described more fully in that standard. IEEE 802.1Q standard provides another means for controlling usage of a network. That standard is directed to the establishment and operation of VLANs. The IEEE 802.1Q standard defines the configuration of network devices to permit packet reception at a configured port entry module. Firewalls also provide a technique for network entry regulation based on their packet analysis functionality previously described.

Figure 4:
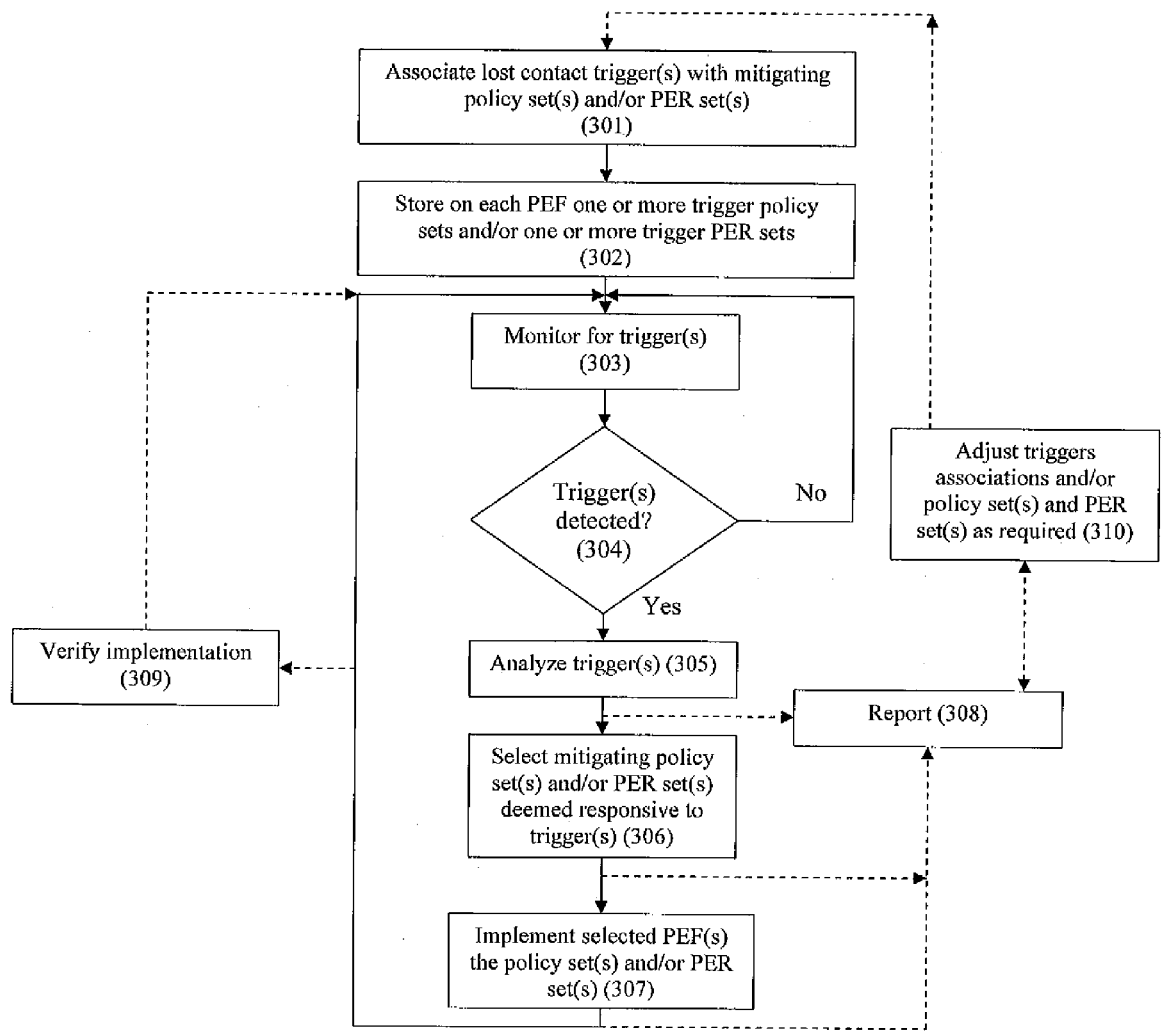
FIG. 4 is a flow diagram of a process of the present invention for responding to lost contact triggers.

With reference to FIG. 4, in operation, a lost contact response process 300 of the present invention preferably occurs at one or more network system devices, including devices with at least the PEF 250 and the policy manager function 200. Functioning of the network, entry to it, and preliminary usage rules may be established in a manner consistent with current practice. Process 300 includes the step of storing in the storage means 251 of the network system device(s) including the PEF 250, one or more policy sets and/or one or more PER sets considered responsive to the lost contact trigger(s) that may be expected (step 302). The policy and/or PER sets may initially be provisioned by the network administrator through the policy server 103. The device including the PEF 250 monitors its interaction with one or more other devices of the network infrastructure 101 for any information that may constitute a lost contact trigger (step 303). It compares that information with triggers stored in the database 202 (step 304) through the analysis function 201. The monitoring may be sporadic or periodic but is preferably continuous.

If there is no match between information that may constitute a trigger and the database of triggers requiring responsive action, the monitoring process continues without change to a policy. It is to be noted that this process is applicable for any network system device having one or more ports, including wireless access points and any other sort of virtual interfaces.

Further under step 304, if a trigger or triggers match is made, the analysis function 201 initiates the process of analyzing the detected trigger(s) for the purpose of determining which policy and/or PER set(s) may be responsive thereto for the purpose of mitigating any effects that may be associated with the trigger under analysis (step 305). Based on that analysis, one or more policy and/or PER sets are selected for implementation (step 306). The policy manager function 200 communicates with the PEF 250 to implement the selected policy and/or PEF set(s) (step 307), preferably by instructing the processor 253 to initiate the process of configuring the forwarding engine 252 with the one or more policies and/or PERs selected.

The monitoring process is continued, or preferably, has remained in effect throughout the trigger identification and response process. An additional optional step of the process 300 includes reporting trigger information, policy and/or PER set selection, and/or PEF 250 implementation selection to a repository, such as policy server 103 but not limited thereto, that may be accessed as desired (step 308). Further, the effect of the policy change implementation may be verified or evaluated by, for example, polling the one or more selected PEFs 250 after control has been restored to confirm whether any implementation activities have been performed (step 309). It is to be understood that all communications among functions should preferably be secured with acceptable means to insure secure and robust communications among trusted parties. These secure communication techniques, such as encryption, are well known to those skilled in the art. Another optional step of the process 300 is to adjust trigger information, and/or information regarding trigger associations with policy and/or PER sets based on reported information (step 310), and to report such adjustments to the repository. It is to be noted that such adjustments may be made automatically, manually, or by administrative means. The adjustments may be made on an escalating or de-escalating scale, dependent upon the particular forwarding device, length of time contact is lost, time of day, partial connectivity, or other inputs.

As indicated, the monitoring is preferably a continuous observation of network traffic. A number of mechanisms exist for automatically monitoring network links, Layer 2 topologies, Layer 3 topologies and the status and utilization of ports and attached functions. For example, Remote Monitoring (RMON) tools and Simple Network Management (SNMP) Management Information Bases (MIBs) are useful and valuable methods to collect the information about network system devices, attached functions, links, network state and status, to provide input into identifying triggers. Input ports on access switches and routers are capable of classifying traffic based on all layers of the ISO (International Standards Organization) seven layer Architecture model. All data fields in the packet may be used along with static and rate based input for input into the trigger monitor.

The following is a list of a few possible devices (but not limited to only those devices) that can contain the policy manager function, the PEF and/or any one or more of the corresponding functions described herein: network switches, data switches, routers, WAN devices, MAN devices, optical switches, firewalls, gateways, computing devices such as network file servers or dedicated usage servers, management stations, Private Exchange Branch (PBX) devices, telecommunication devices, cellular phones, network connected voice over IP/voice over data systems such as hybrid PBXs and VoIP call managers, network layer address configuration/system configuration servers such as enhanced DHCP servers, enhanced Bootstrap Protocol (bootp) servers, IPv6 address auto-discovery enabled routers, and network based authentication servers providing services such as RADIUS, Extensible Authentication Protocol/IEEE 802.1X or others. It is to be noted that the present invention is applicable to telephone as well data communication network systems.

One means to provide the triggers and/or policy and/or PER set information to the databases 202 and 251 is the Simple Network Management Protocol (SNMP). A network administrator provisions the policy information of the terminus of a network cable associated with the attached function. The forwarding engine 252 or other enforcement function reads the terminus information via the SNMP. In another example, MIB parameters may be established or used to obtain and configure the databases 202 and 251 with the triggers and the policy/PER sets. MIBs may also be employed to populate one or more tables of the network system device operating as enforcement devices with historical information for storage and/or caching.

The lost contact response system of the present invention, including the pre-installation of policy and/or PER sets, permits enablement of policy changes at the network system devices including the PEF 250, including the ports of those devices when contact with a controlling policy server has been lost. Automatic enablement of policy changes by the PEFs 250 based on receiving trigger information that can be compared with stored trigger information, and then initiating a signaling that results in direct enforcement of one or more policies on one or more PEFs limits operation of the device in a manner that may have negative effect on the rest of the network infrastructure Those skilled in the art will recognize that many types of triggers, actions, and desired effects may be implemented through the present invention using the lost contact process and related functions for implementing the steps of that process to minimize the impact of lost contact with a controlling server. The exact PERs or PER sets to enforce the desired effect across a diverse network are often extensive and may require detailed knowledge of the hardware, firmware, and management support including MIBs, APIs and other product features. In addition, detailed knowledge of the network topology, redundancy and protocols is needed to craft the PERs and PER sets to implement the desired effect. It is also possible that lost contact responses could be initiated manually by an authorized administrator either through physical or logical buttons or icons.

As previously indicated, it is to be understood that the functions described herein may be implemented in hardware and/or software. For example, particular software, firmware, or microcode functions executing on the network infrastructure devices can provide the implementation function. Alternatively, or in addition, hardware modules, such as programmable arrays, can be used in the devices to provide some or all of those capabilities.

Other variations of the above examples may be implemented. One example variation is that the illustrated processes may include additional steps. Further, the order of the steps illustrated as part of the process is not limited to the order illustrated in FIG. 4, as the steps may be performed in other orders, and one or more steps may be performed in series or in parallel to one or more other steps, or parts thereof. For example, the triggers and/or policy and/or PER sets may be updated periodically or sporadically. Further, the analysis of trigger information and the implementation of a policy change may be performed directly by the PEF 250 without a policy manager function interface. It is further to be noted that the PERs may be different for each port supported by a PEF or PEFs, and/or may be implemented on a per port or per interface basis.

The processes, steps thereof and various examples and variations of these processes and steps, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of system 100 described above and may be distributed across one or more such components.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A method for changing one or more policies and/or one or more policy enforcement rules of one or more of a plurality of packet forwarding devices of a network system including a plurality of network infrastructure devices, the method comprising the steps of:

a. pre-installing on one or more of the plurality of packet forwarding devices one or more policy sets, one or more policy enforcement rule (PER) sets, or a combination of policy and PER sets, associated with usage of the network system, wherein each of the one or more policy sets, PER sets or combination of policy and PER sets is associated with a unique identifier;

b. monitoring the network system for one or more lost contact triggers by monitoring for responses to one or more contact messages from at least one of: 1) the plurality of network infrastructure devices; and 2) one or more attached functions of the network system;

c. upon detection of one or more lost contact triggers, determining for which of the one or more packet forwarding devices to change one or more policy sets and/or PER sets deemed responsive to the detected one or more lost contact triggers;

d. selecting one or more policy sets and/or PER sets deemed responsive to the detected one or more lost contact triggers, wherein the selected one or more policy sets and/or PER sets may include one or more of the pre-installed policy sets and/or PER sets;

e. implementing on one or more of the determined one or more packet forwarding devices the selected one or more policy sets and/or PER sets deemed responsive; and f. reporting the one or more lost contact triggers detected, the determined one or more packet forwarding devices and the policy sets and/or PER sets selected for implementation to a central repository.

2. The method as claimed in claim 1 wherein the step of implementing involves sending to the determined one or more packet forwarding devices only the unique identifiers of the selected one or more pre-installed policy sets and/or PER sets.

3. The method as claimed in claim 1 wherein the step of implementing involves sending to the determined one or more forwarding devices new one or more policy sets and/or PER sets not pre-installed on the packet forwarding devices.

4. The method as claimed in claim 1 further comprising the steps of applying one or more of the identified one or more installed policy sets and/or PER sets incrementally as a function of the detection of the one or more lost contact triggers, and adjusting the application of the one or more installed policy sets and/or PER sets by adding, removing or changing the implementation of the one or more installed policy sets and/or PER sets upon further detection of a change of the one or more lost contact triggers detected.

5. The method as claimed in claim 4 wherein the step of adjusting is dependent upon the particular one or more forwarding devices, the time of day, the length of time of lost contact, or the extent of connectivity to the network infrastructure.

6. The method as claimed in claim 1 wherein the one or more policy sets and/or PER sets is selected from the group consisting of rate limiting all traffic except control traffic, implementing bandwidth limiting leaf ports; and disabling one or more signal exchange protocols.

7. The method as claimed in claim 1 further comprising the step of confirming whether one or more policy sets and/or PER sets were implemented by the one or more packet forwarding devices.

8. The method as claimed in claim 1 wherein the monitoring step is performed by a policy server of the network system transmitting a hello message to one or more of the plurality of packet forwarding devices.

9. The method as claimed in claim 8 wherein the lost contact trigger is a timed out delay in responding to the hello message.

10. The method as claimed in claim 8 wherein the hello message is only transmitted to one or more of the one or more of the plurality of packet forwarding devices directly connected to an attached function of the one or more attached functions associated with the lost contact trigger.

11. The method as claimed in claim 1 wherein the step of implementing includes enabling implementation of the selected one or more policy sets and/or PER sets on one or more ports of the determined one or more packet forwarding devices.

12. The method as claimed in claim 1 wherein the step of monitoring is performed by one or more of the packet forwarding devices transmitting a hello message to one or more other devices of the plurality of network infrastructure devices and one or more attached functions of the network system.

13. The method as claimed in claim 12 wherein one or more of the one more packet forwarding devices transmitting the hello message initiates the implementing step after a timed out delay in receiving a response to the hello message.

14. The method as claimed in claim 12 wherein one of the one or more other devices of the plurality of network infrastructure devices and one or more attached functions of the network system is a server.

15. The method as claimed in claim 12 wherein the hello message is only transmitted to one or more of the plurality of packet forwarding devices directly connected to an attached function of the one or more attached functions associated with the lost contact trigger.

16. A system for changing one or more policies and/or one or more policy enforcement rules of one or more of a plurality of packet forwarding devices of a network system including a plurality of network infrastructure devices, the system comprising:
   a. a packet forwarding device having pre-installed thereon one or more policy sets, one or more policy enforcement rule (PER) sets, or a combination of policy sets and PER sets wherein each of the one or more policy sets, PER sets or combination of policy and PER sets is associated with a unique identifier;
   b. a monitor function to monitor the network system for one or more lost contact triggers by monitoring for responses to one or more contact messages from at least one of the plurality of infrastructure devices of the network system;
   c. an analysis function for determining one or more policy sets and/or PER sets deemed responsive to the detected one or more lost contact triggers to implement on the packet forwarding device, wherein the selected one or more policy sets and/or PER sets may include one or more pre-installed policy sets and/or PER sets;
   d. an implementation function for initiating implementation of the determined one or more policy set or PER set changes deemed responsive;
   e. a policy enforcement function (PEF) for implementing on the packet forwarding device the determined one or more policy sets and/or PER sets deemed responsive; and
   f. a communication function for reporting the one or more lost contact triggers detected and the policy sets and/or PER sets selected for implementation to a central repository.

17. The system as claimed in claim 16 wherein the analysis function and the implementation function form part of a policy manager function.

18. The system as claimed in claim 17 wherein the PEF and the policy manager function reside on the packet forwarding device.

19. The system as claimed in claim 16 wherein the packet forwarding device is a network entry device.

20. The system as claimed in claim 17 wherein the policy manager function further includes a database of triggers, policies, and PERs.

21. The system as claimed in claim 16 further comprising a policy server of the network system configured to perform the monitoring by transmitting a hello message to one or more of the packet of forwarding devices.

22. The system as claimed in claim 21 wherein the lost contact information is a timed out delay in responding to the hello message.

23. The system as claimed in claim 16 wherein the one or more policy sets to be implemented are only pre-installed policy sets and/or PER sets and their implementation is initiated by reference to the associated unique identifiers.

24. The system as claimed in claim 16 wherein the one or more policy sets to be implemented are only policy sets and/or PER sets that have not been pre-installed on the packet forwarding device.

* * * * *